United States Patent
Davis et al.

(10) Patent No.: US 8,711,002 B2
(45) Date of Patent: *Apr. 29, 2014

(54) MONITORING OF UNDESIRABLE FLUID INGRESS INTO SUBSEA CONTROL MODULES

(71) Applicant: Vetco Gray Controls Limited, Bristol (GB)

(72) Inventors: Julian R. Davis, Bristol (GB); Simon David Gill, Bristol (GB); Adrian John Derrick, Bristol (GB)

(73) Assignee: Vetco Gray Controls Limited, Nailsea, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,510

(22) Filed: Mar. 20, 2013

(65) Prior Publication Data

US 2013/0214933 A1 Aug. 22, 2013

Related U.S. Application Data

(63) Continuation of application No. 12/816,734, filed on Jun. 16, 2010, now Pat. No. 8,427,336.

(30) Foreign Application Priority Data

Jun. 17, 2009 (GB) .................................. 0910426.6

(51) Int. Cl.
*G01F 23/24* (2006.01)
*G01F 23/26* (2006.01)
*G05D 9/12* (2006.01)

(52) U.S. Cl.
USPC ........ 340/852; 340/604; 73/304 C; 73/304 R; 116/227; 137/81.2; 137/392; 137/558

(58) Field of Classification Search
USPC ................. 73/40, 290 R, 291, 304 C, 304 R; 116/227; 137/81.2, 392, 551, 552, 557, 137/558; 166/66, 250.03, 250.07, 250.08, 166/336, 337; 340/603, 604, 626, 627, 850, 340/852, 853.2, 856.3; 374/4
See application file for complete search history.

(56) References Cited

U.S. PATENT DOCUMENTS

| 2,668,202 A | 2/1954 | Kaplan |
| 2,919,579 A | 1/1960 | Gronner |

(Continued)

FOREIGN PATENT DOCUMENTS

| CN | 101206154 A | 6/2008 |
| GB | 2285819 A | 7/1995 |

(Continued)

OTHER PUBLICATIONS

Search Report of Related Application GB0910426.6, dated Dec. 18, 2009.

(Continued)

*Primary Examiner* — Levi Gannon
(74) *Attorney, Agent, or Firm* — Bracewell & Giuliani LLP

(57) ABSTRACT

A subsea control module has a casing inside which there is at least one pair of electrodes, there being electronic means connected with the electrodes of the or each pair for monitoring at least one electrical characteristic between the electrodes as a result of a fluid to which the electrodes are exposed. This can include, for example, a change due to an ingress of seawater and/or an ingress of hydraulic fluid into the interior of the casing. The or each pair of electrodes include an array in which each electrode of the pair has finger portions interleaved with finger portions of the other electrode.

21 Claims, 6 Drawing Sheets

(56) References Cited

U.S. PATENT DOCUMENTS

| | | |
|---|---|---|
| 4,230,187 A | 10/1980 | Seto |
| 4,603,581 A | 8/1986 | Yamanoue |
| 5,050,431 A | 9/1991 | McDonald |
| 6,164,132 A | 12/2000 | Matulek |
| 6,640,900 B2 | 11/2003 | Smith |
| 7,255,004 B2 | 8/2007 | Taylor |
| 7,373,817 B2 | 5/2008 | Burdi |
| 7,506,541 B2 | 3/2009 | Woodard |
| 8,427,336 B2 * | 4/2013 | Davis et al. ............... 340/853.2 |
| 2002/0043369 A1 | 4/2002 | Vinegar |
| 2003/0010500 A1 | 1/2003 | Smith |
| 2007/0157718 A1 | 7/2007 | Woodard |
| 2011/0018733 A1 | 1/2011 | Davis |

FOREIGN PATENT DOCUMENTS

| | | |
|---|---|---|
| WO | 8803596 A1 | 5/1988 |
| WO | 9920872 A1 | 4/1999 |
| WO | 2006023690 A3 | 3/2006 |

OTHER PUBLICATIONS

Related U.S. Appl. No. 12/816,734.

Office Action dated Dec. 18, 2013 for related Chinese application No. 201010203650.8.

* cited by examiner

MONITORING OF UNDESIRABLE FLUID INGRESS INTO SUBSEA CONTROL MODULES

RELATED APPLICATIONS

This application is a continuation of and claims priority to and the benefit of U.S. patent application Ser. No. 12/816,734, filed Jun. 16, 2010, which claims priority to and the benefit of United Kingdom Application No. 0910426.6 filed Jun. 17, 2009, each incorporated by reference in its entirety.

BACKGROUND OF THE INVENTION

1. Field of the Invention

The present invention relates to monitoring of undesirable fluid ingress into subsea control modules.

2. Description of the Related Art

The hydraulic and electronic components of a subsea well, such as a hydrocarbon extraction well, are typically housed in a sealed vessel termed a subsea control module (SCM), located on a Christmas tree which is mounted on the sea bed above the well bore. An SCM is, typically filled with electrically insulating oil, to alleviate the need to design it to withstand high pressures and provide a first line of defense for the control system against the seawater environment. Typically, an SCM houses hydraulic manifolds, directional control valves and a subsea electronics module (SEM) which is itself a sealed unit. Thus, ingress of seawater resulting from a leak in the SCM housing, or ingress of hydraulic fluid from a small leak in the hydraulic system, will not in itself cause a malfunction of the control system. However, well operators, historically, have needed to know if there is a seawater leak since this will result in corrosion of the components in the SCM and possible failure of the system earlier than expected.

Existing arrangements consist of sets of metal electrode pairs mounted on an insulating panel or a metal frame with insulating inserts within the SCM, typically four, at equal intervals between the bottom and the top, each connected to an operational amplifier via a low voltage source and a series resistor, thus enabling the detection of the presence of the ingress of electrically conductive seawater, and, in a crude manner, the degree of displacement of the original oil filling. A typical application of the technique is illustrated diagrammatically in FIG. 1 in which a casing 1 of an SCM is shown as a transparent outline to show an electrically insulating panel 2, mounted on the base 3 of the SCM, with pairs 4 of electrodes mounted on it. FIG. 2 shows circuitry 5 around an operational amplifier 6, typically housed in the SEM within the SCM, to which the electrode pairs, are connected. Since the resistance across a pair of electrodes when in contact with seawater is very low, i.e. effectively a short circuit, they are shown in a block 7 as simple switch contacts 8, 9, 10 and 11. One of the electrodes of each pair is connected to a voltage source V, typically 2 volts. The gain of the circuit 5 is the ratio of the resistance of a feedback resistor 12 across amplifier 6 and the effective resistance provided by input resistors 13, 14, 15 and 16, each of which is in series with a respective one of the electrode pairs 4 and an input of amplifier 6. Each of the input resistors is chosen to be of a resistance which is one quarter of that of the feedback resistor 12. Thus, if there is water ingress into the casing 1 to the level of the lowest electrode pair, then the contacts 8 of the block 7 are effectively closed and the output 17 of the operational amplifier 6 will rise to ¼ of V. Likewise, further ingress of seawater reaching the remaining electrode pairs will result in the output 17 rising to ½ V, ¾ V and V respectively as the contacts 9, 10 and 11 become effectively closed. Thus, a crude indication of the seawater ingress level is obtained by the electronic circuitry of the SEM reading the output 17 of the circuit 5 and transmitting the information topside, as a digitised version of the analogue signal, to the well operator, typically via the well umbilical, as part of the well housekeeping/diagnostic telemetry.

A problem with the existing technique is that it is unable to detect the ingress of hydraulic fluid into the SCM resulting from a leak in the hydraulic system in the SCM. Currently, a well operator has relied on hydraulic fluid leak detectors at the fluid source but these cannot confirm whether the leak is actually within the SCM. A further problem is that current flow through the electrode pairs results in their corrosion.

This invention enables the detection of both the ingress of seawater and hydraulic fluid in the SCM and provides a better indication of the degree of ingress, and reduces corrosion of the sensing electrodes.

Recent measurements have been made in the laboratory of the change in conductivity of the insulating oil in an SCM with contamination by the hydraulic fluid used for the well control system, which is a glycol based trans-aqua fluid. Results show that the conductivity of the contaminate in the oil is much less than that due to seawater and thus the existing contamination detection technique described before was not sensitive enough to be able to detect the ingress of trans-aqua fluids. Measurements have also shown that sea-water and trans-aqua hydraulic fluid (glycol) in insulating oil result in an immiscible fluid with both contaminants having a greater density than the oil. Thus, ingress of these contaminants displaces the transformer oil from the base of the SCM upwards. This invention provides an improved method for the monitoring of undesirable fluid ingress into an SCM to enable detection of the ingress of trans-aqua hydraulic fluid as well as seawater, whilst still providing a zoned measure of the degree of ingress and using a variety of methods of measurement which also reduces, substantially, corrosion of sensing electrode pairs.

SUMMARY OF THE INVENTION

According to the present invention from one aspect, there is provided a subsea control module having a casing inside which there is at least one pair of electrodes, there being electronic means connected with the electrodes of the or each pair for monitoring at least one electrical characteristic between the electrodes as a result of a fluid to which the electrodes are exposed, wherein the or each pair of electrodes comprises an array in which each electrode of the pair has finger portions interleaved with finger portions of the other electrode.

There could be at least one such array on a base of the casing. Preferably, there is a plurality of such arrays on the base of the casing, each of which; for example, is at or near a respective corner of the casing.

Preferably, there is such an array disposed on a side wall of the casing and covering a zone of the side wall. In this case, said array disposed on a side wall could cover a lower zone of the side wall, which array, for example, also covers a portion of the base of the casing. Said portion of the base of the casing could be at or near a corner of the casing.

Preferably, there is at least one further such array after said array disposed on a side wall of the casing, the or each further such array covering a respective zone up the side wall of the casing.

The at least one electrical characteristic could comprise at least one of resistance and capacitance.

Preferably, the or each array is disposed on a mat of electrically insulating material. Preferably, said electronic means is provided by a subsea electronics module of the control module.

According to the present invention from another aspect, there is provided a subsea control module having a casing inside which there are a plurality of electrode pairs, there being electronic means connected with the electrodes of each pair for monitoring at least one electrical characteristic between the electrodes of the pair as a result of a fluid to which the electrodes are exposed, wherein said electrode pairs are disposed on a base of the casing.

Preferably, there are also a plurality of further electrode pairs, each of which covers a respective zone up a side wall of the casing, said electronic control means being connected with the electrodes of each of the further electrode pairs.

Preferably, for both aspects of the invention, the electronic means applies a signal between the electrodes of the or each pair of electrodes for selected periods of time at selected intervals.

A module according to the invention could include pressure sensing means for sensing the pressure of fluid in the casing for use in providing an indication of an increase in pressure due to fluid leakage within the casing.

A module according to the invention could include release means for releasing fluid from the casing in response to an increase in fluid pressure within the casing above a threshold.

There could be a flowmeter coupled with said release means for providing an indication of the release of fluid.

According to the present invention from a further aspect, there is provided a subsea control module having a casing inside which there is at least one electrode pair, there being electronic means connected with the electrodes of the or each pair for monitoring at least one electrical characteristic between the electrodes of the pair as a result of a fluid to which the electrodes are exposed, wherein said electronic means applies a signal between the electrodes of the or each pair of electrodes for selected periods of time at selected intervals.

According to the present invention from yet a further aspect, there is provided a subsea control module including pressure sensing means for sensing the pressure of fluid in a casing of the module for use in providing an indication of an increase in pressure due to fluid leakage within the casing.

According to the present invention from yet a further aspect, there is provided a subsea control module including release means for releasing fluid from a casing of the module in response to an increase in fluid pressure within the casing above a threshold.

DETAILED DESCRIPTION

Figure 1:
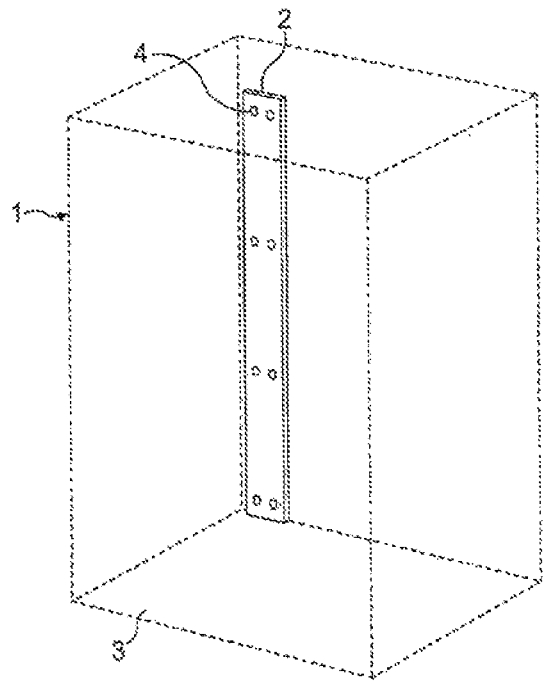
FIG. 1 illustrates a prior art system.
Figure 2:
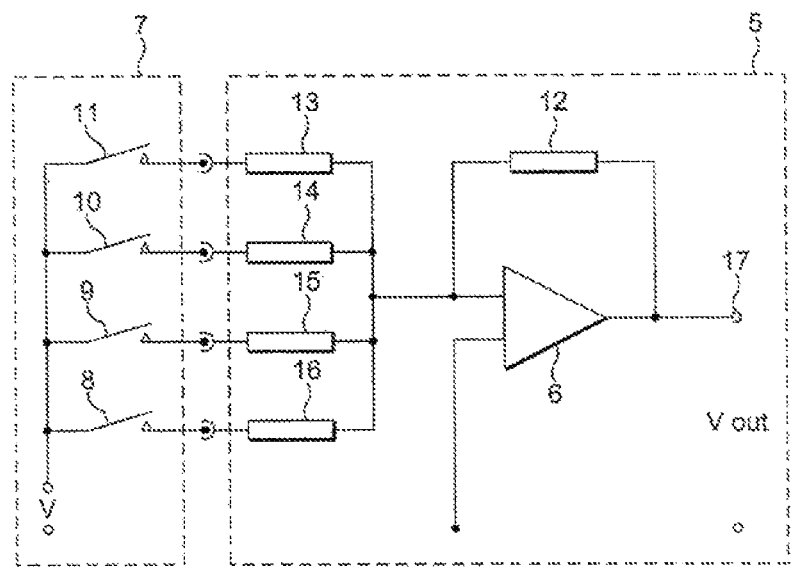
FIG. 2 illustrates circuitry for use with the system of FIG. 1.
Figure 3:
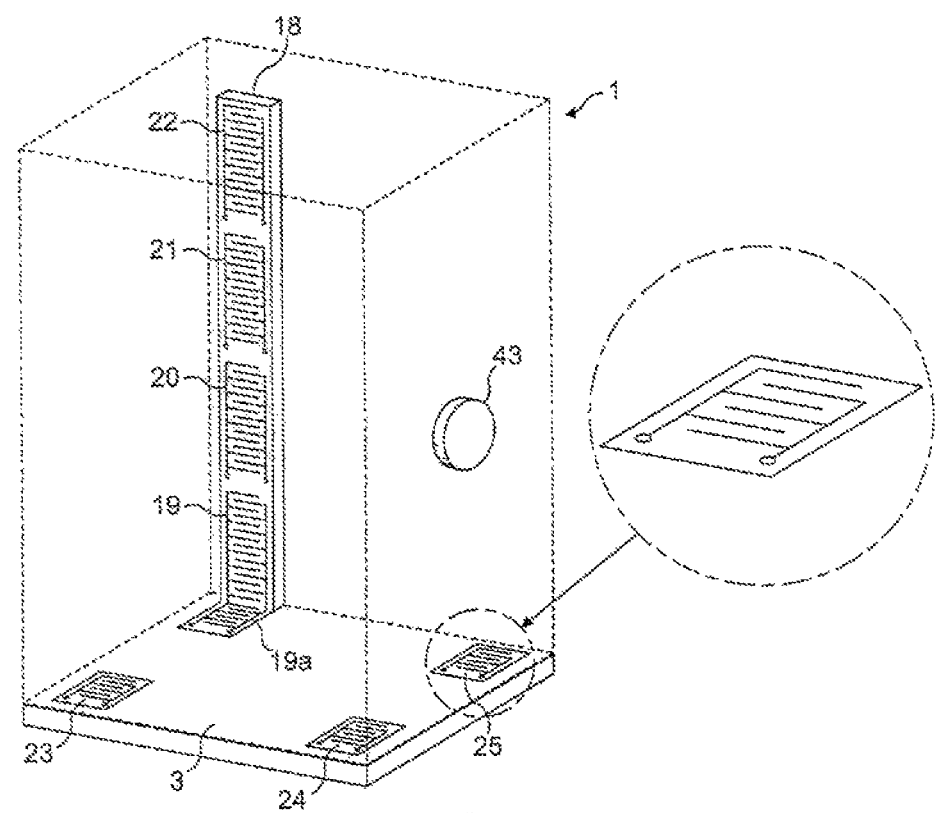
FIG. 3 illustrates a system according to an embodiment of the invention.

Referring to FIG. 3, the individual electrode pairs of the system of FIG. 1 are replaced with electrode pairs, in each of which each electrode of the pair has finger portions interleaved or interlaced with finger portions of the other electrode to form an electrode array. The arrays are on an electrically insulating mat 18, typically mounted on the internal base 3 of the casing 1 of the SCM and extending up a side wall of the SCM. Typically, each array is printed in copper on to a flexible printed wiring board and then gold plated for protection against corrosion, the board being mounted on a frame. The mat is divided into four sections, a lower section with a first electrode array 19, including a horizontal portion 19a on an electrically insulating mat on the base 3 at or near a corner of the casing 1, and a vertical portion, with the latter rising to a quarter of the height of the SCM. The other three sections have respective electrode arrays 20, 21 and 22 and cover half, three quarters and the top quarter of the height of the SCM, resulting in four vertical detection zones. Three other small horizontal gold plated electrode arrays with interleaved electrode pairs in the form of arrays 23, 24 and 25 are also mounted on the SCM base 3 on electrically insulating mats, at or near each of the other three corners respectively. The electrode pairs of each of the detection zones and the three corner mats are connected to conditioning and detection circuitry housed in the SEM within the SCM. The vertical arrays 19 to 22 provide a measure of the quantity of ingress of undesirable fluid into the SCM, i.e. up to a quarter, half, three quarters and full displacement of the original insulating oil by sea-water or hydraulic fluid or both. The electrode array 19 by virtue of portion 19a, and the electrode arrays 19, 23, 24 and 25 provide early detection of small quantities of sea-water and/or hydraulic fluid ingress even when the installation of the SCM is not truly vertical and are typically connected in parallel to the conditioning and detection circuitry and treated as one array.

Figure 4:
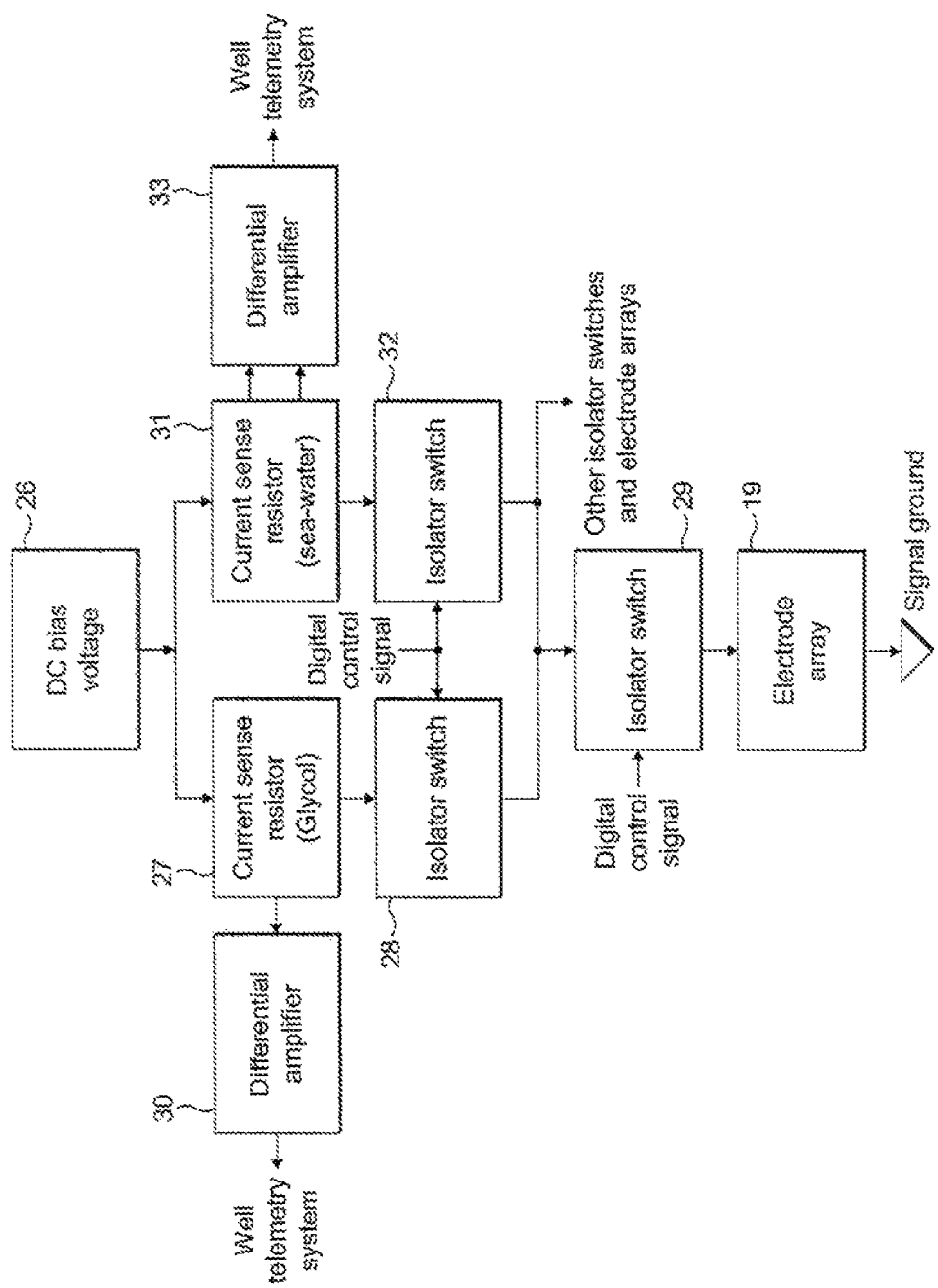
FIGS. 4, 5 and 6 illustrate forms of circuitry for use with the system of FIG. 3.

FIG. 4 shows a block diagram of the conditioning and detection circuitry for the detection of fluid ingress using changes of resistance between the electrodes of the arrays. With the SCM filled with clean, uncontaminated oil, the resistance between the terminals of any of the electrode array 19 to 25 is very high, typically tens of megohms. With a small ingress of trans-aqua fluid, e.g. enough to cover arrays on the mats mounted on the SCM housing base, the resistance will fall typically to a few hundred kilohms. Ingress of seawater will also be detected by the system as only a small amount of ingress will cover at least one of the arrays of the mats on the SCM base and reduce the resistance between the electrodes of the array to only a few tens of ohms. The electrode pair on each mat, for example that of array 19, is fed from a low voltage DC source 26, typically 2 volts, via a current measuring resistor 27 and isolator switches 28 and 29. The current flow through the electrode pair produces a voltage fed to a differential amplifier 30, which produces an analogue output, converted to a digital message that is added to the well monitoring telemetry, fed topside, via the well umbilical. Although only one electrode array (19) is shown in FIG. 4, the other arrays 20-25 are selected in turn by isolator switches similar to 29 of FIG. 4. The connection of the low voltage source 26 to the arrays is controlled by the isolator switch 28, which is operated by a digital control system also located typically in the SEM. The isolator switch 26 is closed only for a brief period, just long enough for the conditioning and detection circuitry to make a measurement, and repeated infrequently. Since the ingress of fluid is typically a slow process, measurement cycle time to measurement execution time ratios in excess of 10,000 to 1 are adequate. This reduces the corrosion of the electrode pairs on a mat due to electrolytic action to a negligible level. The process described above is repeated for the detection of sea-water ingress, by the same low voltage source 26, connected to the arrays via a current measuring resistor 31 and an isolator switch 32, producing an output to the well telemetry system from a differential amplifier 33.

Since the resistance between the electrode pairs on mats resulting from hydraulic fluid ingress is much greater (kilohms) than that resulting from seawater ingress (tens of ohms), the value of the measuring resistor 27 is much greater than the resistor 31 to produce a greater detection circuitry gain. Although the ingress of sea-water will swamp the hydraulic fluid ingress detection circuitry, this is of little concern since the detection of seawater ingress is itself sufficiently serious to warrant corrective action by the well operator.

Figure 5:
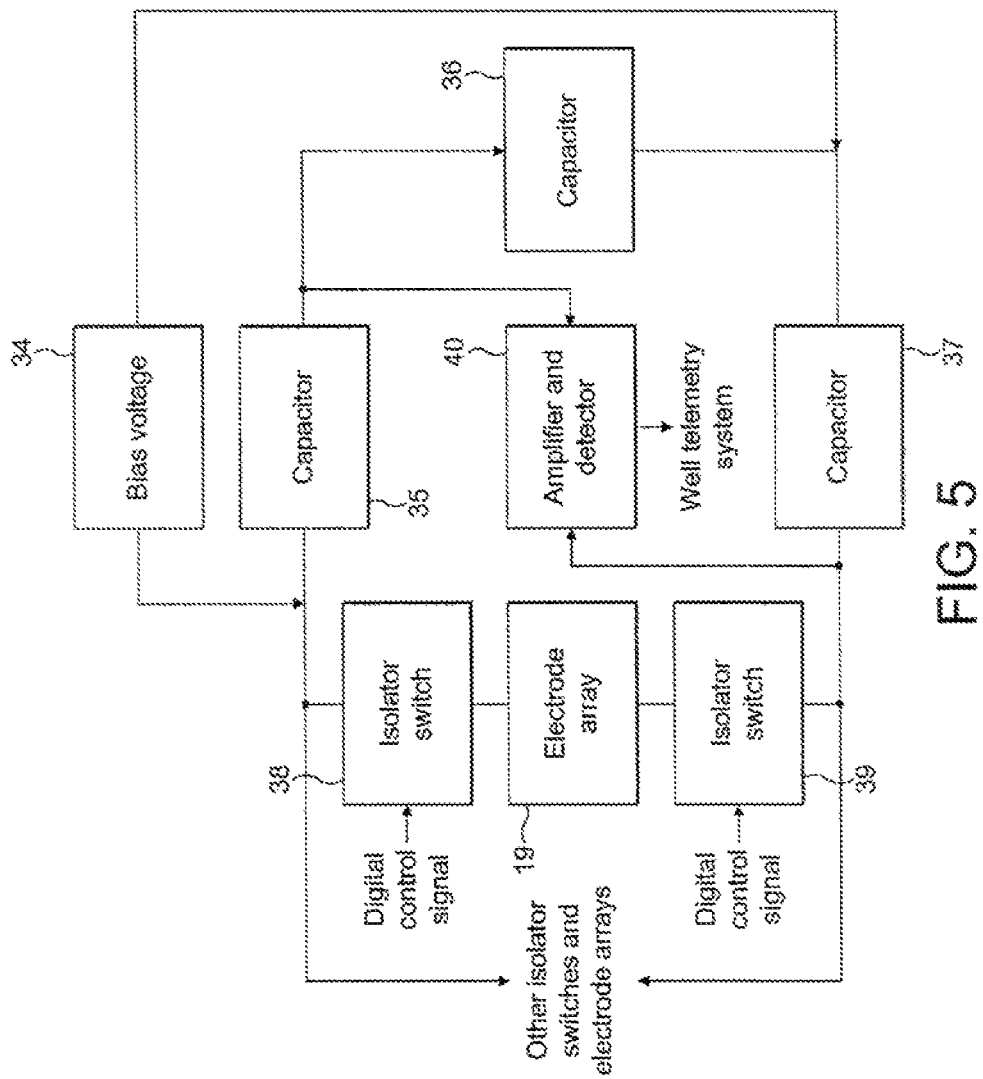

FIG. 5 shows a block diagram of alternative conditioning and detection circuitry for the detection of fluid ingress utilising the change of capacitance between the electrode pair on any of the mats. This method can also be employed as an addition to the resistance measuring method, to provide greater confidence to the well operator that the detection of hydraulic fluid ingress, in particular, is accurate. A low voltage AC source is connected across two of the arms of a bridge circuit comprising three capacitors 35, 36 and 37 and the electrode pair of array 19, with two isolator switches 38 and 39. The other two arms of the bridge are connected to AC amplification and detection circuitry 40, to produce a DC output which is fed to the telemetry system of the well. The values of the capacitors 35, 36 and 37 are chosen to match the capacitance between the electrode pair of array 19 when immersed in the oil within the SCM, so that the bridge circuit is balanced and there is no output to the circuitry 40. Ingress of hydraulic fluid into the SCM results in a change of capacitance between the electrode pair of array 19 and thus an AC output from the bridge and into the amplification and detection circuitry 40, which in turn produces an output to the well telemetry system. A variation of this method is to electronically adjust the value of the capacitor 36, to maintain the balance of the bridge, i.e. zero output from the amplification and detection circuitry 40, and use a measure of the bridge balancing capacitance as the source to the well telemetry system. Again, the arrays 19, 23, 24 and 25 are typically connected in parallel to the conditioning and detection circuitry and treated as one array and monitoring of other zones achieved by selecting the arrays 20, 21 and 22 by additional isolator switches.

Figure 6:
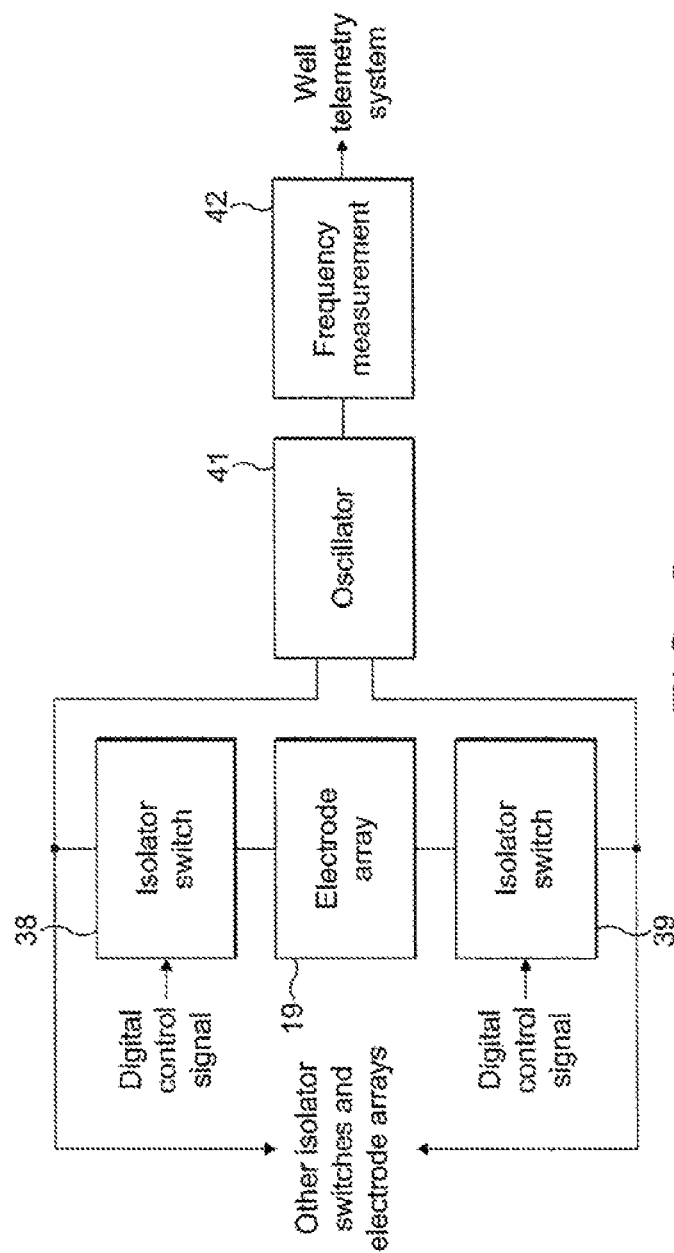

FIG. 6 shows a block diagram of an alternative method of detecting a change of capacitance due to undesirable fluid ingress. This method utilises the change of capacitance between the electrodes of array 19, resulting from the change of dielectric constant of the fluid it is immersed in, when there is ingress of sea-water and/or hydraulic fluid. The change of capacitance results in a change of frequency of an oscillator 41 which can be measured and translated into a DC output using a frequency measuring circuit 42, such as a discriminator and detector, as an output to the well telemetry system. The array 19 is selected by isolator switches 38 and 39 and different zones can be monitored by further isolator switches selecting the arrays. Again, the arrays 19, 23, 24 and 25 are typically connected in parallel to the conditioning and detection circuitry and treated as one array, and monitoring of other zones achieved by selecting the arrays 20, 21 and 22 by additional isolator switches.

Leakage of hydraulic fluid in the SCM results in an increase in pressure within the outer casing 1. This can be monitored, typically, by a diaphragm type pressure sensor 43, mounted on the wall of the SCM outer casing 1, and connected to the SEM within the SCM and its output also fed into the well monitoring telemetry system. The detection of hydraulic fluid ingress by the methods described above can thus be supported by a change of pressure, giving greater confidence of the detection process to the well operator.

Figure 7:
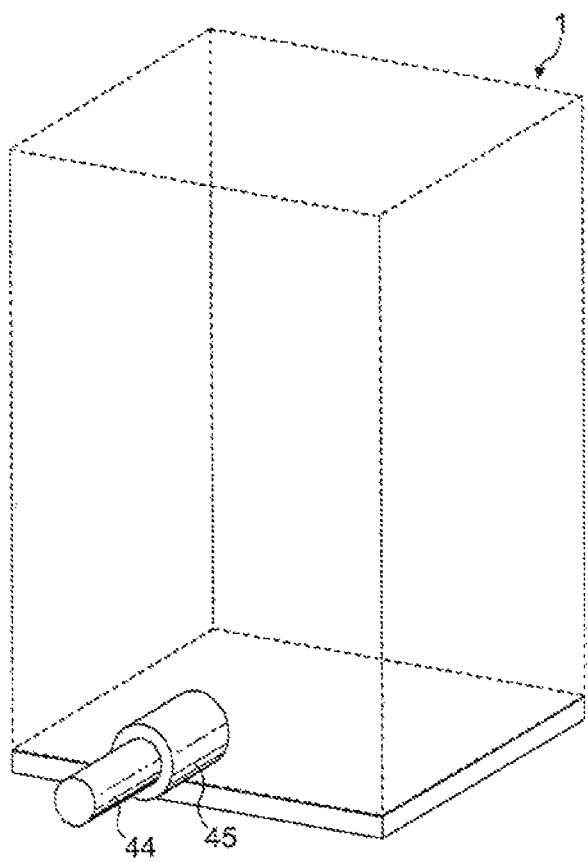
FIG. 7 shows how pressure release means can be provided.

An additional method of monitoring leakage of hydraulic fluid into the SCM, to provide even greater corroboration of the electrical detection method, is to fit a differential pressure release valve and a flowmeter to the SCM casing as illustrated in FIG. 7. The pressure release valve 44, is set, typically, to open when the pressure in the SCM exceeds the external environmental pressure by 5 psi, resulting from a hydraulic fluid leak. When the valve 44 opens the flow of liquid from the SCM to the environment is detected by the flowmeter 45, whose electrical output is connected to the well monitoring telemetry system, thus advising the well operator to a fluid leak.

The key advantage is that the invention permits detection of hydraulic fluid leakage within the SCM in the absence of seawater ingress, and provides an indication of the degree of leakage, neither of which are possible with existing SCM ingress fluid ingress detection systems. Furthermore the system detects the ingress of seawater as well. Corrosion of the detection electrodes is also virtually eliminated.

This application claims is a continuation of and claims priority to and the benefit of U.S. patent application Ser. No. 12/816,734, filed Jun. 16, 2010, which claims priority to and the benefit of United Kingdom Application No. 0910426.6 filed Jun. 17, 2009, each incorporated by reference in its entirety.

The invention claimed is:

1. A subsea control module for a subsea well installation, comprising:
   a casing defining a housing of the subsea control module having insulating oil disposed therein and containing one or more hydraulic components within an interior thereof, the housing configured to prevent ingress of seawater therein when the subsea control module is operably deployed;
   a pair of electrodes contained within the interior of the housing, the pair of electrodes comprising an array in which each electrode of the pair has finger portions interleaved with finger portions of the other electrode of the pair; and
   a subsea electronics module operably coupled to the pair of electrodes and configured to detect changes in an electrical characteristic between the pair of electrodes as a result of a change in characteristic of fluid to which the pair of electrodes are exposed, wherein
   the subsea electronics module comprises seawater ingress detection circuitry and hydraulic fluid ingress detection circuitry switchably connected to the pair of electrodes.

2. A subsea control module as defined in claim 1,
   wherein the seawater ingress detection circuitry is configured to detect the ingress of seawater into the interior of the housing responsive to the seawater displacing the insulating oil normally in contact with the pair of electrodes, and
   wherein the hydraulic fluid ingress detection circuitry is configured to detect the ingress of hydraulic fluid into the interior of the housing responsive to hydraulic fluid displacing the insulating oil normally in contact with the pair of electrodes.

3. A subsea control module as defined in claim 1, wherein the pair of electrodes is a first pair of electrodes, the subsea control module further comprising:
   at least one other pair of electrodes, which together with the first pair of electrodes, form a plurality of pairs of electrodes contained within the interior of the casing, each pair of electrodes of the at least one other pair of electrodes comprising an array in which each electrode of the respective pair has finger portions interleaved with finger portions of the other electrode of the respective pair, each array of the plurality of pairs of electrodes disposed on an interior surface of a side wall of the casing and each covering a different zone of a plurality of zones each extending longitudinally along the sidewall of the casing at a distance from a base of the casing that is different than the distance from the base of each other of the plurality of zones.

4. A subsea control module as defined in claim 3, wherein the plurality of pairs of electrodes is a first plurality of pairs of electrodes, the subsea control module further comprising:
   a second plurality of pairs of electrodes contained within the interior of the casing, each pair of electrodes of the second plurality of pairs of electrodes comprising an array in which each electrode of the respective pair has finger portions interleaved with finger portions of the other electrode of the respective pair, each of said arrays disposed spaced apart from each other of said arrays on an interior surface of the base of the casing to provide early detection of ingress of relatively small quantities of seawater, ingress of hydraulic fluid, or both ingress of seawater and ingress of hydraulic, when the subsea control module is not oriented truly vertically.

5. A subsea control module as defined in claim 1, wherein the pair of electrodes is a first pair of electrodes, the subsea control module further comprising:
   at least one other pair of electrodes, which together with the first pair of electrodes, form a plurality of pairs of electrodes contained within the interior of the casing, each pair of electrodes of the at least one other pair of electrodes comprising an array in which each electrode of the respective pair has finger portions interleaved with finger portions of the other electrode of the respective pair, each array of the plurality of pairs of electrodes disposed spaced apart from each other array on an interior surface of the base of the casing to provide early detection of ingress of relatively small quantities of seawater, ingress of hydraulic fluid, or both ingress of seawater and ingress of hydraulic, when the subsea control module is not oriented truly vertically.

6. A subsea control module as defined in claim 1, further comprising:
   pressure sensing means for sensing the pressure of fluid within the casing and for providing an indication of an increase in pressure due to fluid leakage within the casing.

7. A subsea control module as defined in claim 1, further comprising:
   release means for releasing fluid from the casing in response to an increase in fluid pressure within the casing above a threshold.

8. A subsea control module as defined in claim 7, further comprising:
   a flowmeter operably coupled with said release means for providing an indication of the release of fluid through the release means.

9. A subsea control module for a subsea well installation, comprising:
   a casing configured to prevent ingress of seawater within the casing when the subsea control module is operably deployed;
   a plurality of pairs of electrodes contained within an interior of the casing, each pair of electrodes comprising an array in which each electrode of the respective pair has finger portions interleaved with finger portions of the other electrode of the respective pair, each array disposed on an interior surface of a side wall of the casing and each covering a different zone of a plurality of zones each extending longitudinally along the sidewall of the casing at a distance from a base of the casing that is different than the distance from the base of each other of the plurality of zones; and
   seawater ingress detection circuitry and hydraulic fluid detection on circuitry switchably connected to each pair of electrodes of the plurality of pairs of electrodes.

10. A subsea control module as defined in claim 9,
    wherein each of the seawater ingress detection circuitry and the hydraulic fluid ingress detection circuitry are configured to detect changes in an electrical characteristic between each pair of electrodes as a result of a change in characteristic of fluid to which at least one pair of electrodes is exposed;
    wherein the seawater ingress detection circuitry is further configured to detect ingress of seawater into the interior of the casing when so occurring responsive to said change in characteristic; and
    wherein the hydraulic fluid ingress detection circuitry is further configured to detect ingress of hydraulic fluid into the interior of the casing when so occurring responsive to said change in characteristic.

11. A subsea control module as defined in claim 9, wherein the plurality of pairs of electrodes is a first plurality of pairs of electrodes, the subsea control module further comprising:
    a second plurality of pairs of electrodes contained within the interior of the casing, each pair of electrodes of the second plurality of pairs of electrodes comprising an array in which each electrode of the respective pair has finger portions interleaved with finger portions of the other electrode of the respective pair, each said arrays disposed spaced apart from each other of said arrays on an interior surface of the base of the casing to provide early detection of ingress of relatively small quantities of seawater, ingress of hydraulic fluid, or both ingress of seawater and ingress of hydraulic when the subsea control module is not oriented truly vertically.

12. A subsea control module for a subsea well installation, comprising:
    a casing having a sidewall and a base, the casing configured to prevent ingress of seawater therein when the subsea control module operably deployed;
    a plurality of pairs of electrodes contained within an interior of the casing, each pair of electrodes comprising an array in which each electrode of the respective pair has finger portions interleaved with finger portions of the other electrode of the respective pair, each array disposed spaced apart from each other array on an interior surface of the base of the casing to provide early detection of ingress of relatively small quantities of undesirable fluid when the subsea control module is not oriented truly vertically, the undesirable fluid comprising seawater, hydraulic fluid, or both seawater and hydraulic fluid; and
    seawater ingress detection circuitry and hydraulic fluid ingress detection circuitry switchably connected to each pair of electrodes of the plurality of pairs of electrodes.

13. A subsea control module as defined in claim 12, further comprising:
    at least one pair of electrodes disposed on an interior surface of a side wall of the casing to provide for determining a measure of quantity of ingress of the undesirable fluid into an interior of the casing when so occurring.

14. A subsea control module as defined in claim 12,
wherein each of the seawater ingress detection circuitry and the hydraulic fluid ingress detection circuitry is configured to detect changes in an electrical characteristic between each respective pair of electrodes as a result of a change in characteristic of fluid to which the respective pair of electrodes is exposed;
wherein the seawater ingress detection circuitry is further configured to detect the ingress of seawater into the interior of the casing when so occurring responsive to said change in characteristic; and
wherein the hydraulic fluid ingress detection circuitry is further configured to detect the ingress of hydraulic fluid into the interior of the casing when so occurring responsive to said change in characteristic.

15. A subsea control module for a subsea well installation, comprising:
a casing containing one or more hydraulic components within an interior thereof and configured to prevent ingress of seawater therein when the subsea control module is operably deployed;
a pair of electrodes contained within the interior of the casing;
electronic circuitry operably coupled to the pair of electrodes and configured to detect changes in an electrical characteristic between the pair of electrodes as a result of a change in characteristic of fluid to which the pair of electrodes are exposed, and responsive to the change in characteristic, to detect ingress of seawater into the interior of the casing when so occurring and to detect ingress of hydraulic fluid into the interior of the casing when so occurring; wherein
the electronic circuitry comprises seawater ingress detection circuitry and hydraulic fluid ingress detection circuitry switchable connected to the pair of electrodes.

16. A subsea control module as defined in claim 15, further comprising:
a pressure sensor mounted on a wall of the casing and positioned and configured to detect a pressure change caused by ingress of hydraulic fluid into the interior of the case; and
wherein the electronic circuitry is operably coupled to the pressure sensor.

17. A subsea control module as defined in claim 15, further comprising:
a valve positioned and configured to release fluid from the interior of the casing in response to an increase in fluid pressure above a threshold internal pressure resulting from an ingress of hydraulic fluid; and
a flowmeter coupled with the valve positioned and configured to provide an indication of release of fluid from within the interior of the casing.

18. A method of monitoring ingress of undesirable fluid into a subsea control module for a subsea well installation, the method comprising the steps of:
providing a subsea control module having a casing configured to prevent ingress of seawater therein when operably deployed, the casing containing one or more hydraulic components within an interior thereof and a pair of electrodes for detecting ingress of undesirable fluid therein; and
detecting ingress of an undesirable fluid responsive to exposure of the pair of electrodes to the undesirable fluid, the undesirable fluid comprising one or more of the following undesirable fluids: seawater entering within the interior of the casing as a result of a leak in the casing and hydraulic fluid entering within the interior of the casing as a result of a leak in the one or more hydraulic components,
wherein the step of detecting ingress of an undesirable fluid comprises:
connecting seawater ingress detection circuitry to the pair of electrodes, and
connecting hydraulic fluid ingress detection y to the pair of electrodes.

19. A method as defined in claim 18, further comprising the step of:
identifying whether the ingress is of seawater or hydraulic fluid.

20. A method as defined in claim 18, further comprising the steps of:
detecting a pressure change within the interior of the casing; and
identifying the ingress of an undesirable fluid as being an ingress of hydraulic fluid responsive to detecting the ingress of the undesirable fluid together with detecting the pressure change within the interior of the case.

21. A method as defined in claim 18, further comprising the steps of:
releasing fluid from the interior of the casing in response to an increase in fluid pressure above a threshold internal pressure resulting from ingress of hydraulic fluid within the interior of the casing; and
providing an indication of the release of fluid from within the interior of the casing.

* * * * *